United States Patent [19]

Nikkanen et al.

[11] Patent Number: 5,699,746
[45] Date of Patent: Dec. 23, 1997

[54] METHOD AND APPARATUS FOR FEEDING AIR INTO A FURNACE

[75] Inventors: Samuli Nikkanen; Markku Tanttu, both of Varkaus, Finland

[73] Assignee: A. Ahlstrom Corporation, Noormarkku, Finland

[21] Appl. No.: 627,613

[22] Filed: Apr. 4, 1996

[30] Foreign Application Priority Data

Apr. 6, 1995 [FI] Finland .................................. 951640

[51] Int. Cl.⁶ .............................................. F23L 15/00
[52] U.S. Cl. ...................... 110/348; 110/302; 110/265; 110/238; 431/160
[58] Field of Search ........................ 110/260, 264, 110/265, 302, 314, 348, 104 B, 234, 238; 431/160, 188; 122/10, 167 D, 47; 162/375

[56] References Cited

U.S. PATENT DOCUMENTS

| | | | |
|---|---|---|---|
| 2,778,346 | 1/1957 | Woolley et al. | 110/260 X |
| 3,743,471 | 7/1973 | Jaeger | 431/188 X |
| 4,109,613 | 8/1978 | Hayden et al. | 110/302 X |
| 4,210,411 | 7/1980 | Ward et al. | 431/160 |
| 5,112,216 | 5/1992 | Tenn | 431/160 X |

FOREIGN PATENT DOCUMENTS

| | | |
|---|---|---|
| 15 643 | 1/1934 | Finland . |
| 9305646 | 7/1994 | Finland . |

*Primary Examiner*—Henry A. Bennett
*Assistant Examiner*—Susanne C. Tinker
*Attorney, Agent, or Firm*—Nixon & Vanderhye PC

[57] ABSTRACT

Combustion gas is fed to a furnace, preferably a recovery boiler for combusting black liquor from cellulose pulp processing, through a gas nozzle disposed in association with a wall of the furnace. The nozzle has a longitudinal axis of elongation, an exterior, and a hollow interior. Cooling gas is directed into contact with the nozzle exterior, and typically also the furnace wall where the nozzle engages the furnace wall. The cooling gas typically moves in a direction substantially perpendicular to the longitudinal axis of the nozzle (e.g. at a velocity of between 10–30 m/sec), and cools the nozzle. Combustion gas passes through the nozzle hollow interior and enters the furnace facilitating combustion of black liquor within the furnace. Desirably the cooling gas is redirected and enters the nozzle interior as the combustion gas. The nozzle may be further cooled by cooling fins or studs on a portion of the nozzle exterior impacted by cooling gas. The rate of gas flow may be regulated to control the amount of gas redirected into the nozzle for use as combustion gas. The invention results in effective cooling of the nozzle to extend its life, recovery of heat from the nozzle by utilizing it to preheat the combustion air, and the prevention of clogging of the cooling air flow paths because they are maintained distinct from areas where furnace impurities exist.

20 Claims, 4 Drawing Sheets

METHOD AND APPARATUS FOR FEEDING AIR INTO A FURNACE

BACKGROUND AND SUMMARY OF THE INVENTION

The invention relates to a method and apparatus for feeding combustion gas, typically air, into a furnace, and a furnace assembly including a particular combustion gas feeding structure. The invention is particularly useful in soda recovery boilers which burn black liquor produced in the manufacture of cellulose pulp to recover energy from the black liquor, as well as recovery of the chemical content of the liquor.

In conventional recovery boilers, the air necessary for combustion of the organic substances contained in the black liquor is supplied through particular air nozzles into the interior of the furnace of the boiler. Typically the air is introduced into the furnace at three different levels. At a lowermost level primary air nozzles are provided. Above the primary air nozzles are secondary air nozzles. Located above the secondary air nozzles are tertiary air nozzles. Some boilers are provided with more than three levels of air introduction nozzles.

Some conventional nozzles are made of different types of steel, and either are welded together, or fully cast. Other nozzles are made from different types of refractory materials. Typically the nozzles are fixed to the tube walls of the furnace such as by welding or with screw joints. Normally the nozzles are disposed inside of a box which is fixed to the tube wall and has an outer shell made of steel plate. The box is typically filled with refractory material which protects the components of the nozzle, and conducts heat, transmitting it away from the nozzle.

Combustion air is introduced into the furnace through the nozzles from air ducts surrounding the boiler. Typically the air ducts have a regulating device for each nozzle. Air passes through an air guide and then through the nozzle into the furnace. The volume of air flowing through the nozzles is regulated so that the flow rate varies widely. If there is a small air flow rate from the nozzle to the boiler, the air flow through the nozzle interior does not cool the nozzle to a significant degree. Radiation heat of the boiler furnace raises the temperature of the nozzle to a high level, and reactive and corroding substances such as sodium hydroxide are entrained within turbulent gases at the nozzle area. The refractory material inside the box affixed to the tube wall is not capable of transmitting heat by conduction very effectively from the nozzle, therefore the nozzle can oftentimes reach a temperature that is higher than desired.

When the nozzle is at high temperature, and there is the presence of reactive and corrosive substances, the nozzle quickly becomes corroded. Thereafter the refractory material in the box outside the nozzle also is damaged by the chemical attack of the corrosive substances. When the refractory material inside the box has deteriorated, the box itself may be damaged, and in a worse case scenario it is necessary to shut down the recovery boiler for repairs. In order to avoid catastrophic shutdowns the air nozzles have to be repaired on a regular basis during maintenance shutdowns. The repairs of the air nozzles are difficult and labor intensive, requiring dismantling of equipment, removing of existing nozzles, and other time consuming procedures. Often the refractory material box has to be dismantled too, such maintenance shutdowns typically being long and causing significant production losses.

Also in conventional nozzle systems, such as shown in Finnish published patent application 9305646 dated Jul. 22, 1994, the internal flow path of the nozzle becomes clogged after a short period of time because the combustion and cooling gas passing through the nozzle may contain impurities therein, or impurities from the furnace may pass therein, which can clog the flow paths and lower cooling efficiency.

According to the present invention a method of feeding combustion gas to a furnace, and for directing cooling gas in an efficient manner, and a furnace assembly utilizing structures for these purposes, are provided which overcome the problems discussed above.

According to the present invention a method and apparatus are provided which effect efficient cooling of air nozzles in a recovery boiler thereby providing a longer life for the nozzles, with significantly extended times between maintenance shutdowns. Because the air nozzles are efficiently cooled according to the present invention the surface temperature does not rise to too high a level during operation, so that excessive corrosion does not occur. Also according to the present invention cooling is continuous, and cooling air flow paths are not clogged during operation because where the cooling air impacts the nozzle to effect cooling is outside of the volume where impurities from the furnace are present, so that cooling efficiency always remains high. Also according to the present invention heat may be recovered from the nozzle by using the heat removed from the nozzle to preheat the combustion gas. Also the furnace assembly according to the present invention provides a structure that is easy to maintain and repair, lowering repair and shutdown costs considerably.

While the invention is particularly applicable to recovery boilers for the combustion of black liquor from cellulose pulp processes, it may also be applied to other combustion furnaces.

According to one aspect of the present invention a method of feeding combustion gas to a furnace through a gas nozzle disposed in association with a furnace wall (the nozzle having a longitudinal axis of elongation, an exterior, and a hollow interior) is provided. The method comprises the steps of: (a) directing cooling gas into contact with the nozzle exterior in a direction substantially perpendicular (e.g. between about 60°–120° to the longitudinal axis) to the longitudinal axis of elongation of the nozzle, to cool the nozzle; and (b) passing combustion gas through the nozzle hollow interior substantially along the longitudinal axis of elongation thereof so that the combustion gas enters the furnace and facilitates combustion within the furnace. Step (a) is typically practiced using combustion gas as the cooling gas, and there is the further step (c) of redirecting the combustion gas from step (a) so that it is utilized as the combustion gas in step (b).

There may be the further step of further cooling the gas nozzle by providing cooling fins or coding studs on the portion of the gas nozzle which is impacted by the cooling gas. There may be also the further step of regulating the rate of gas flow during the practice of step (c). Typically the combustion gas is substantially air (e.g. generally ambient air as far as chemical makeup is concerned, or in some circumstances oxygen enriched or oxygen depleted air). In the preferred embodiment there is the further step of introducing waste liquor from cellulose pulp processing (e.g. black liquor) into the furnace so that it combines with the combustion gas introduced in step (b) and burns in the furnace.

The nozzle may include a portion thereof (e.g. a first end) engaging the furnace wall, and step (a) may be practiced to direct the cooling gas into contact with both the furnace wall and the nozzle portion engaging the furnace wall. The nozzle may have a second end remote from the furnace wall and an intermediate opening between the first and second ends and the nozzle may be disposed within a duct having an upper section through which combustion gas flows through the intermediate opening and the lower section separated from the upper section. In this case step (a) is practiced by the cooling gas through the lower section of the duct, past the nozzle exterior adjacent the first end thereof, and then into the upper section of the duct, to ultimately pass through the intermediate opening into the nozzle hollow interior (being regulated as it passes through the intermediate opening).

According to another aspect of the present invention a method of feeding combustion gas into a furnace through a gas nozzle comprises the steps of: (a) directing cooling gas into contact with both the nozzle exterior of the nozzle portion engaging the furnace wall, and furnace wall; and (b) passing combustion gas through the nozzle hollow interior substantially along the longitudinal axis of elongation thereof so that the combustion gas enters the furnace and facilitates combustion within the furnace. The details of steps (a) and (b), and the additional steps that may be provided, are as described above.

According to yet another aspect of the present invention a furnace assembly is provided comprising the following components: A furnace wall defining a furnace combustion chamber on a first side thereof and having a second, opposite, side thereof. A gas inlet nozzle having a longitudinal axis of elongation, an exterior, a hollow interior, and a first end section thereof positioned with respect to the furnace wall so that combustion gas flowing through the hollow interior passing into the combustion chamber, and an opening remote from the first end and through which gas passes into the hollow interior. A duct disposed on the second side (opposite side of the furnace wall from the combustion chamber) for supplying combustion gas to the opening of the nozzle. Means defining an open volume around the nozzle exterior adjacent the first end section of the nozzle, and between the furnace wall and the duct. And, means for directing cooling gas into the open volume to cool the nozzle.

The nozzle first end section may have at least one cooling fin or stud (and preferably a plurality of each or both) formed on the nozzle portion that is impacted by cooling gas, to facilitate heat transfer. The means defining an open volume may comprise a sealed protrusion extending from the duct to the furnace wall, or a separate structure distinct from the duct, or any suitable structure mounted by one or both of the furnace wall and the duct (or another structure on the opposite side of the furnace wall from the combustion chamber).

The nozzle may have a second end remote from the first end and the opening may comprise an intermediate opening between the first and second ends. The open volume may open up into the duct in communication with the intermediate opening so that the cooling gas enters the nozzle interior and passes through the nozzle interior as combustion gas. A regulating means may be disposed in operative association with the intermediate opening for controlling the flow rate of gas through the intermediate opening into the hollow interior of the nozzle. The air duct may include a spacer plate below the nozzle for dividing the duct into a lower section and an upper section, the upper and lower sections communicating substantially only through the means defining an open volume. A feed duct may be connected by means for conveying a portion of the gas in the feed duct to the lower section of the duct. At least one of the furnace wall on the second side thereof and the nozzle exterior may also be provided with gas flow guide plates, for guiding cooling gas flow past the nozzle exterior. The nozzle first and second ends may be connected together in a readily detachable manner (e.g. by a clearance fit, quick release coupling, frangible coupling, screw connectors with air flow passages, or any other suitable conventional structure).

The cooling gas (air) is typically taken from an air duct where a higher pressure prevails, such as a secondary air duct connected to a primary duct, or by using a separate cooling air duct or channel. The gas typically flows past the nozzle at a high velocity, e.g. on the order of between about 10–30 meters per second, e.g. between about 15–25 meters per second. The regulation of the flow rate of cooling air may be provided by allowing only a selected portion of the air flowing into the duct from cooling the nozzle to enter the furnace as combustion air, or by providing the regulation of separate flows of combustion and cooling air. Separate ducts may be provided for regulating the flow rate of cooling gas.

It is the primary object of the present invention to provide for the effective cooling of air nozzles in furnaces, such as recovery boilers, to allow recovery of heat from the cooling of the nozzle (e.g. by preheating the combustion gas), and by ensuring that cooling air flow paths are not clogged by impurities. This and other objects of the invention will become clear from an inspection of the detailed description of the invention and from the appended claims.

DETAILED DESCRIPTION OF THE DRAWINGS

Figure 1:
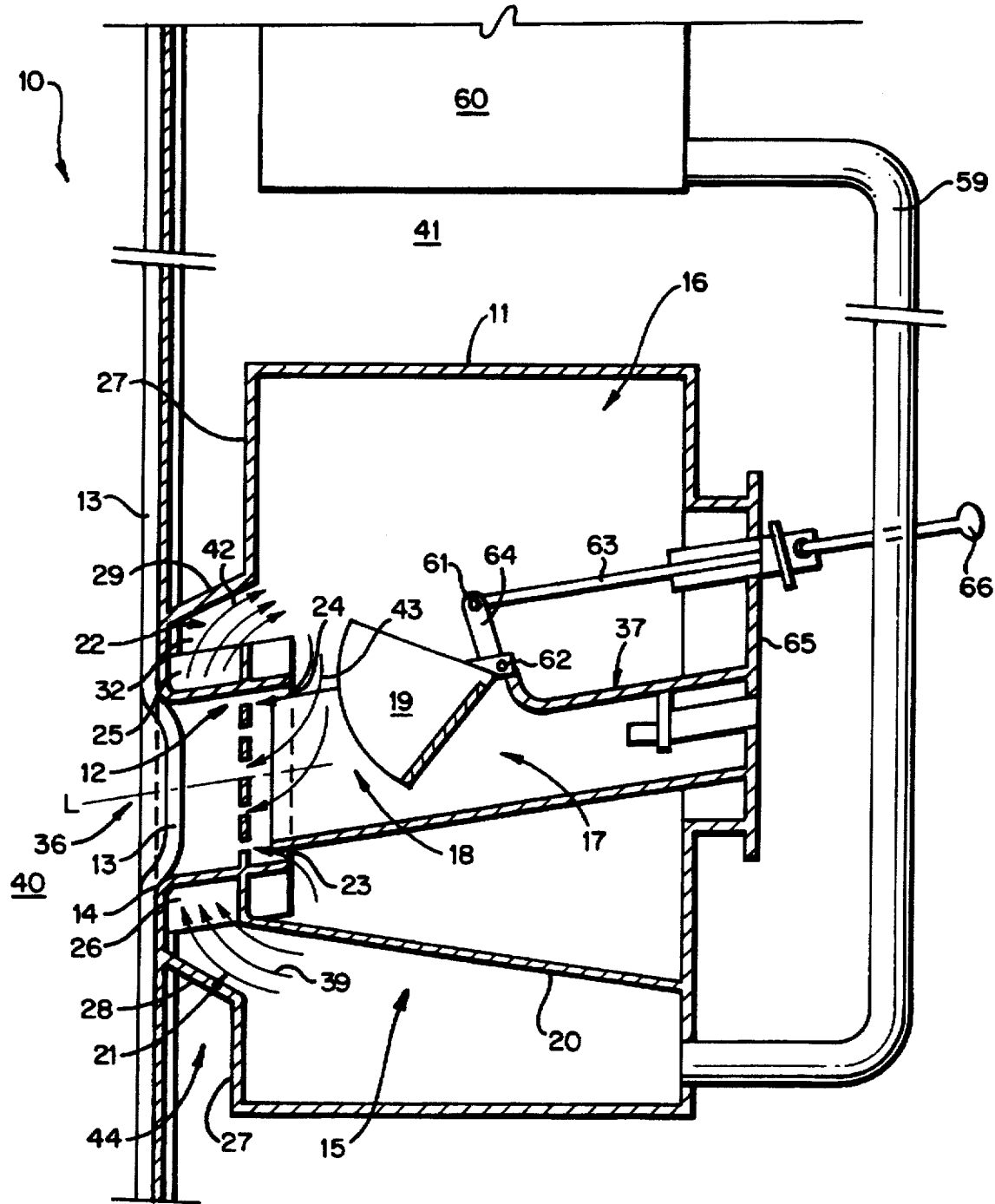
FIG. 1 is a side view, primarily in cross-section and partly in elevation, of an exemplary cooled air nozzle according to the present invention in association with a furnace wall and cooling/combustion gas supply means.

In the drawings the following reference numerals are utilized which correspond to the indicated elements.

| Reference # | Element |
| --- | --- |
| 10 | Furnace assembly in general |
| 11 | Air duct |
| 12 | Gas nozzle |
| 13 | Furnace wall (constructed of water tubes) |
| 14 | Air guide/cooling plates |
| 15 | Lower section of air duct |
| 16 | Upper section of air duct |
| 17 | Nozzle second end/air guide |
| 18 | Intermediate opening between ends of nozzle |
| 19 | Air flow rate regulator |

-continued

| Reference # | Element |
|---|---|
| 20 | Solid plate dividing duct into upper and lower sections |
| 21 | Opening between lower section of air duct and exterior of nozzle |
| 22 | Opening between exterior of nozzle and upper section of air duct |
| 23, 24 | Air slots allowing air flow to cool interior surface of nozzle |
| 25, 26 | Cooling fins |
| 27 | Front wall plate of air duct |
| 28, 29 | Top and bottom plates connecting air ducts to furnace wall |
| 30 | Cooling air supply duct |
| 31 | Cooling air distribution duct associated with each nozzle |
| 32, 33 | Side plates connecting air duct to furnace wall |
| 34 | Cooling stud |
| 35 | Hollow nozzle interior surface |
| 36 | Nozzle first end |
| 37 | Nozzle second end support |
| 38 | Nozzle exterior |
| 39 | Cooling gas flow toward nozzle exterior |
| 40 | Furnace combustion chamber |
| 41 | Opposite side of furnace wall from combustion chamber |
| 42 | Heated cooling gas flow from nozzle exterior |
| 43 | Cooling gas flow redirected as combustion gas flow |
| 44 | Protrusion formed by plates 28, 29, 32, 33 |
| 51 | Boiler corner air feed ducts |
| 52 | Adjusting rods |
| 53 | Movable air regulating plates |
| 54 | Air flow direction arrow |
| 55 | Opening defined by regulating plate |
| 57 | Distribution plate |
| 59 | Cooling air conducting channel |
| 60 | Secondary air duct |
| 61 | Pivot pin between levers |
| 62 | Pivot shaft connecting regulating device to adjusting rod |
| 63 | Adjusting lever/rod |
| 64 | Auxiliary lever |
| 65 | Supporting wall for adjusting lever/rod |
| 66 | Rod for moving adjusting lever/rod |

FIG. 1 shows an air duct 11, wherein is disposed a baffle-type air regulating device 19, and an air guide 17 which is part of or in association with a gas nozzle 12. The air regulating device 19 pivots about a shaft 62 by means of an adjusting lever/rod 63 and auxiliary lever 64, the levers 63, 64 pivotally connected by pin 61. A manual rod 66 adjusts movement of lever/rod 63 to effect adjustment of the rate of gas flow 43 through opening 18, by altering the position of the air regulating device 19. The regulating device 19 may be of a different structure than the arrangement illustrated, any conventional flow regulating components (baffles, conic sections, hemispheres, or the like) being suitable.

Inside the air duct 11 is disposed the gas nozzle 12, which is fixed to water tubes of the furnace wall 13 defining the boiler furnace chamber 40. A portion of the air from a secondary duct 60 is fed to the lower section 15 of the air duct 11 around the boiler on the opposite side (41) of wall 13 from chamber 40, such as the primary air duct via channel or duct 59. In section 15, the air pressure is higher than in the upper section 16 of the air duct 11. Between the two sections 15, 16 of the air duct 11 is disposed a solid plate 20, which prevents air (e.g. 39) from flowing directly upwardly from the lower section 15 of the duct 11.

On the duct 11 side wall 27 (which is on the furnace side of duct 11), by each nozzle 12 or nozzle group (see FIG. 4), there is a protrusion 44 formed by metal plates 28, 29, 32 and 33. Wall 27 is spaced a distance from the furnace wall 13, and the protrusion 44 is of the same length as this distance so that the volume defined by the protrusion 44 is air-tight. The air in the lower section 15 has access to the upper section 16 of the duct 11 only through the volume between plates 28, 29, 32, 33 and the nozzle 12. The air 39 flows through an opening 21 outside the nozzle, substantially perpendicular to its longitudinal axis of elongation L of the nozzle 12 and typically substantially in the vertical direction. The heated air 42 flows further via opening 22 to the upper section 16 of the duct 11.

From the upper section 16 of the duct 11, the combustion air 43 flows to the air guide/nozzle end 17, through the intermediate opening 18 defined by the regulating device 19, to the nozzle 12 interior 35, and then to the furnace combustion chamber 40. The nozzle 12 is preferably in two pieces, e.g. the end of the air guide (second end) 17 is inside the first end 36 of air nozzle 12. The inner surface 35 of the nozzle 12 is cooled by a small air leak flowing continuously through air slots 23 and 24.

The air nozzle 12 ends 36 and 17 are connected by a clearance fit or another easy to detach connection (e.g. quick release coupling, or the like, as described above) so that the ends 36/17 are easy to disconnect from each other.

The structures of the regulating device 19 and the air guide/nozzle end 17 are not limited to what is described herein, but may be of any other shape. Instead of the arrangement illustrated in FIG. 1, the regulating device 19, air guide/nozzle end 17, and duct 11 with spacer plate 20, may be disposed "upside down" so that cooling air flows from the upper section 16 of the duct past the nozzle 12 to the lower section 15 and therefrom via the opening 18 to the air nozzle 12 and furnace chamber 40.

The air ducts 60 and 11 of FIG. 1 may also be other than primary and secondary air ducts, such as for example tertiary and secondary air ducts to tertiary and primary air ducts, etc.

Figure 2:
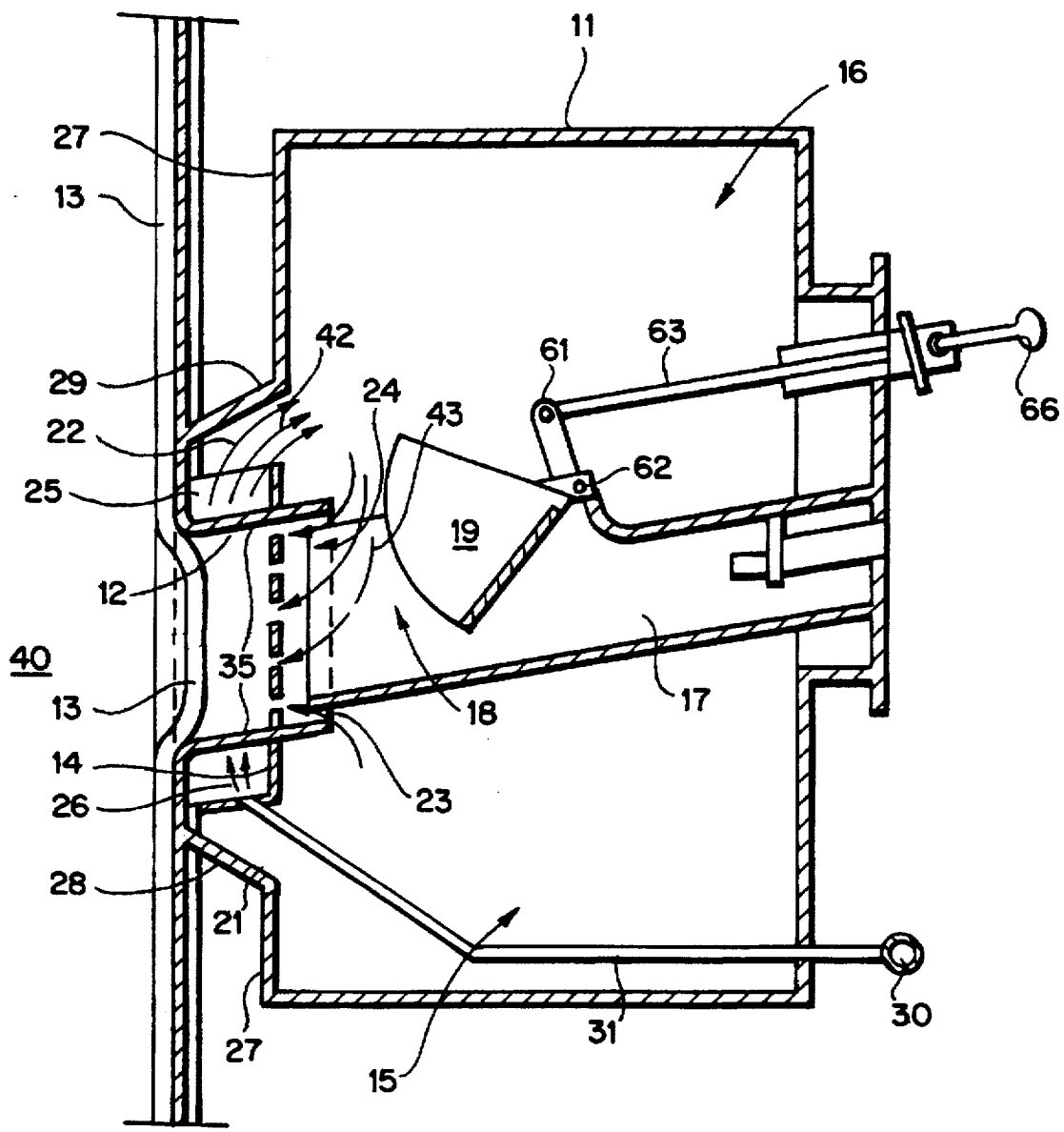
FIG. 2 is a view like that of FIG. 1 only showing a different combustion/cooling gas supply means.

FIG. 2 illustrates an alternative system for feeding cooling air. In this embodiment the air duct 11 has not been divided into two sections, but the upper section 16 and lower section 15 are within the same volume. The cooling air passes via duct 30 through a separate distribution duct 31 for each nozzle 12. The end of each duct 31 is so positioned and directed that cooling of the air nozzle 12 is as efficient as possible. This arrangement is applicable when the cooling air has a high pressure.

Figure 3:
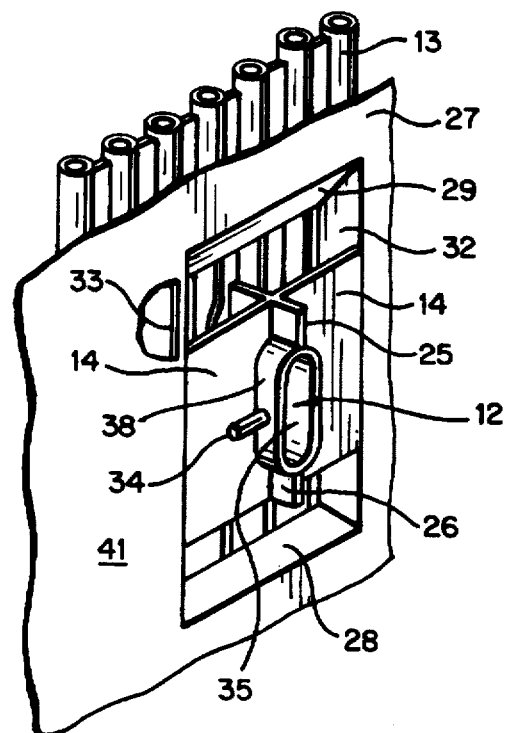
FIG. 3 is a detail perspective view showing the air nozzle of FIGS. 1 and 2 in association with a tube wall from the exterior of the furnace.

FIG. 3 illustrates an example of a nozzle 12 construction having heat conductive metal cooling fins 25 and 26 (and/or cooling studs 34), and also including air guide plates/cooling plates 14, when there is only one nozzle 12. The cooling fins 25 and 26 and studs 34 are so attached (e.g. by welding) to the air nozzle 12 that they conduct heat. Heat conductive metal guide plates/cooling plates 14 are attached to the air nozzle 12 and cooling fins 25 and 26 in a heat conductive manner (e.g. by welding). The air guide plates/cooling plates 14 are connected air-tightly at their side edges to the furnace side wall panel 27 of the air duct 11. The wall plate 27 is spaced a distance from the furnace wall 13 of the furnace chamber 40, and the plates 28, 29, 32, and 33 are connected with the wall panel 27 and wall 13 in an air tight manner, surrounding the nozzle 12. Thus, the air 39 conducted from below to the volume between the air guide plate/cooling plate 14 and wall 13 cannot come out until it reaches upper opening 22 (gas flow 42). The air nozzle 12 may be provided with additional cooling fins, for example, in a vertical direction in the volume between the wall 13 and air guide plate/cooling plate 14. The air flow 39 may be at high velocity, e.g. between about 10–30 m/sec (e.g. between about 15–25 m/sec).

Figure 4:
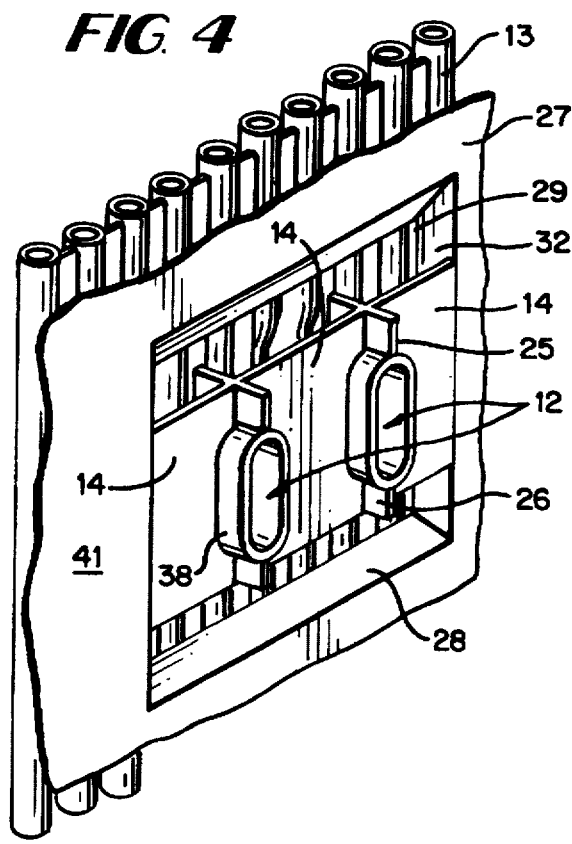
FIG. 4 is a view like that of FIG. 3 only shown in an embodiment in which a group of nozzles are provided together instead of a single nozzle.

FIG. 4 illustrates an example of a construction of cooling fins 25 and 26 of the air nozzles 12 and air guide plates/ cooling plates 14 when a group of two nozzles 12 is provided. Between the nozzles 12 is located an air guide plate/cooling plate 14, which partly transfers heat from each nozzle 12 to the flow 39, 42 of cooling air.

Figure 5:
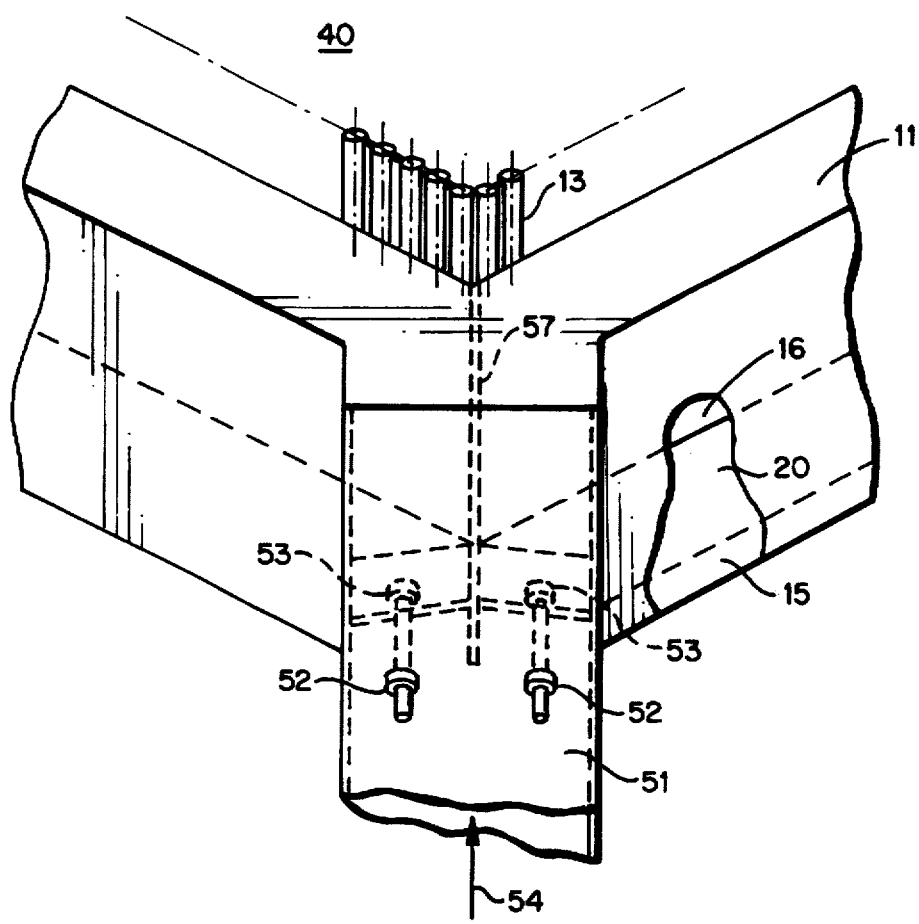
FIG. 5 is a schematic view illustrating apparatus for distributing air from an air feed duct at a corner of the boiler with which the nozzles of FIGS. 1 through 4 may be utilized.
Figure 6:
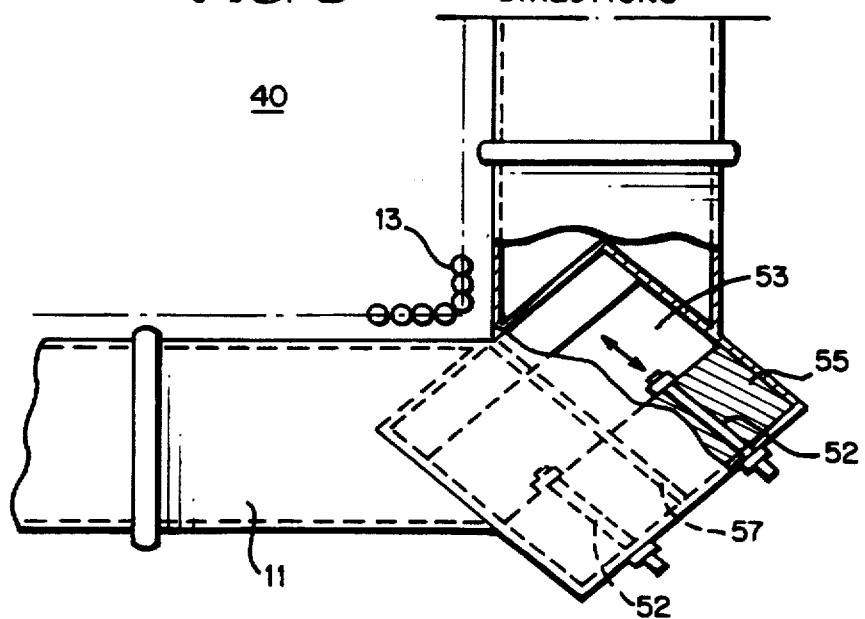
FIG. 6 is a view like that of FIG. 5 showing an alternative embodiment of the air distributing apparatus.

FIGS. 5 and 6 illustrate a potential principle of distributing air to sections 15 and 16 of the air duct 11. The corners of the boiler are provided with air feed ducts 51. Air 54 passes through feed duct 51 upwardly. The air feed duct 51 is provided with a distribution plate 57, which is in a vertical direction and fixedly mounted. Movable air regulating plates 53 divide the air, according to a selection made by an operator, either above or below the plate 20. When an opening 55 (oblique strokes) is small, a large portion of the air is guided below the plate 20, to the duct section 15. Thereby, the air nozzles 12 are cooled with a large volume/ rate air flow. Correspondingly, when the opening 55 is large, a smaller portion of the air flows to the duct section 15 below the plate 20. In this case, the cooling air flow volume/rate past the nozzles 12 is small.

FIGS. 5 and 6 show air regulating plates (two pieces) 53 which move linearly by an adjusting rod 52. With two air regulating plates 53 it is possible to some extent to influence the distribution of air per wall among the duct sections. It is also possible to make an air regulating plate 53 as a single, hinged, turnable adjusting plate. In that case, vertical fixedly mounted distribution plate 57 may be eliminated.

Thus it will be seen that according to the present invention a method and apparatus have been provided having a number of advantages compared to the prior art. By providing an exterior cooling gas flow in a crosswise direction with respect to the flow of combustion gas within the nozzle hollow interior, effective cooling of the nozzle takes place. Because the nozzle temperature stays relatively low corrosion is much less of a problem, and shutdowns for repair and replacement of the nozzles need be less frequent than in conventional recovery boilers. Also by providing the particular air flow according to the invention it is possible to recover heat from the nozzle; since the cooling air is heated by the nozzle, and since the coding air is desirably redirected so as to provide combustion air flowing through the nozzle, the heat from cooling the nozzle is not wasted. Also the cooling air flow paths are not clogged during operation because where cooling takes place is outside of any area where there is access by impurities from the furnace combustion chamber. Also the construction is such so that component parts may be readily replaced.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and structures.

What is claimed is:

1. A method of feeding combustion gas to a furnace through a gas nozzle disposed in association with a furnace wall, the nozzle having a longitudinal axis of elongation, an exterior, and a hollow interior and wherein the nozzle includes a portion thereof engaging the furnace wall; said method comprising the steps of:

(a) directing cooling gas into contact with both the nozzle exterior of the nozzle portion engaging the furnace wall, and furnace wall; and (b) passing combustion gas through the nozzle hollow interior substantially along the longitudinal axis of elongation thereof so that the combustion gas enters the furnace and facilitates combustion within the furnace.

2. A method as recited in claim 1 wherein step (a) is practiced using combustion gas as the cooling gas; and comprising the further step (c) of redirecting the combustion gas from step (a) so that it is utilized as the combustion gas in step (b).

3. A method as recited in claim 2 comprising the further step (d) of introducing waste liquor from cellulose pulp processing into the furnace so that it combines with the combustion gas introduced in step (b) and burns in the furnace; and wherein during the practice of step (a) the cooling gas moves with a velocity of between about 10–30 m/sec.

4. A method of feeding combustion gas to a furnace through a gas nozzle disposed in association with a furnace wall, the nozzle having a longitudinal axis of elongation, an exterior, and a hollow interior; said method comprising the steps of:

(a) directing cooling gas into contact with the nozzle exterior in a direction substantially perpendicular to the longitudinal axis of elongation of the nozzle, to cool the nozzle; and (b) passing combustion gas through the nozzle hollow interior substantially along the longitudinal axis of elongation thereof so that the combustion gas enters the furnace and facilitates combustion within the furnace.

5. A method as recited in claim 4 wherein step (a) is practiced using combustion gas as the cooling gas; and comprising the further stop (c) of redirecting the combustion gas from step (a) so that it is utilized as the combustion gas in step (b).

6. A method as recited in claim 5 comprising the further step (d) of further cooling the gas nozzle by providing cooling fins or cooling studs on a portion of the exterior of the gas nozzle contacted by the cooling gas in step (a).

7. A method as recited in claim 5 comprising the further step (d) of regulating the rate of gas flow during the practice of step (c).

8. A method as recited in claim 5 wherein the combustion gas is substantially air.

9. A method as recited in claim 4 wherein the nozzle includes a portion thereof engaging the furnace wall; and wherein step (a) is practiced to direct the cooling gas into contact with both the furnace wall and the nozzle portion engaging the furnace wall.

10. A method as recited in claim 4 comprising the further step (c) of introducing waste liquor from cellulose pulp processing into the furnace so that it combines with the combustion gas introduced in step (b) and burns in the furnace.

11. A method as recited in claim 4 wherein the nozzle has a first end engaging the furnace wall, and a second end remote from the furnace wall, and an intermediate opening between the first and second ends; and wherein the nozzle is disposed within a duct having an upper section through which combustion gas flows through the intermediate opening, and a lower section separated from the upper section; and wherein step (a) is practiced by passing the cooling gas through the lower section of the duct, past the nozzle exterior adjacent the first end thereof, and then into the upper section of the duct to pass through the intermediate opening into the nozzle hollow interior.

12. A furnace assembly, comprising:

a furnace wall defining a furnace combustion chamber on a first side thereof, and having a second, opposite, side thereof;

a gas inlet nozzle having a longitudinal axis of elongation, an exterior, a hollow interior, and a first end section thereof positioned with respect to said furnace wall so that combustion gas flowing through said hollow interior passing into said combustion chamber, and an opening remote from said first end and through which gas passes into said hollow interior;

a duct disposed on the second side of the furnace wall for supplying combustion gas to said opening of said nozzle;

means defining an open volume around said nozzle exterior adjacent said first end section of said nozzle, and between said furnace wall and said duct, and sealed from said combustion chamber; and means for directing cooling gas into said open volume to cool said nozzle.

13. A furnace assembly as recited in claim 12 wherein said nozzle first end section has at least one cooling fin or stud formed on said nozzle exterior.

14. A furnace assembly as recited in claim 12 wherein said means defining an open volume comprises a protrusion formed by a plurality of plates extending from said duct to said furnace wall.

15. A furnace assembly as recited in claim 12 wherein said nozzle has a second end remote from said first end, and wherein said opening comprises an intermediate opening between said first and second ends; and wherein said open volume opens up into said duct in communication with said intermediate opening so that the cooling gas enters said nozzle interior and passes through said nozzle interior as combustion gas.

16. A furnace assembly as recited in claim 15 further comprising a regulating device disposed in operative association with said intermediate opening for controlling the flow rate of gas through said intermediate opening into said hollow interior of said nozzle.

17. A furnace assembly as recited in claim 15 wherein said duct includes a spacer plate below said nozzle for dividing said duct into a lower section and an upper section, said upper and lower sections communicating substantially only through said means defining an open volume.

18. A furnace assembly as recited in claim 17 wherein said duct comprises a first duct; and further comprising a feed duct connected by means for conveying a portion of the gas in said feed duct to said lower section of said first duct.

19. A furnace assembly as recited in claim 12 wherein at least one of said furnace wall on said second side thereof and said nozzle exterior is provided with gas flow guide plates, for guiding cooling gas flow past said nozzle exterior.

20. A furnace assembly as recited in claim 12 wherein said nozzle includes a second end remote from said first end, and wherein said first and second ends are connected together in a readily detachable manner that allows the flow of cooling gas therethrough.

* * * * *